(12) United States Patent
Kida et al.

(10) Patent No.: US 12,291,641 B2
(45) Date of Patent: May 6, 2025

(54) METAL PIGMENT COMPOSITION AND COLORING METHOD

(71) Applicant: Seiko Epson Corporation, Tokyo (JP)

(72) Inventors: Hiroaki Kida, Shiojiri (JP); Shintaro Asai, Matsumoto (JP); Kei Hiruma, Chino (JP); Tomoyuki Ushiyama, Chino (JP); Mitsunobu Nakatani, Shiojiri (JP); Kenta Tsukada, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 771 days.

(21) Appl. No.: 17/586,920

(22) Filed: Jan. 28, 2022

(65) Prior Publication Data

US 2022/0243080 A1 Aug. 4, 2022

(30) Foreign Application Priority Data

Jan. 29, 2021 (JP) ................................ 2021-013533

(51) Int. Cl.
*C09D 11/322* (2014.01)
*C09D 11/102* (2014.01)
*C09D 11/326* (2014.01)
*C09D 17/00* (2006.01)

(52) U.S. Cl.
CPC .......... *C09D 11/322* (2013.01); *C09D 11/102* (2013.01); *C09D 11/326* (2013.01); *C09D 17/006* (2013.01)

(58) Field of Classification Search
CPC ..... C09D 11/322; C09D 11/36; C09D 11/102; C09D 11/326; C09D 7/62; C09D 17/006; B05D 5/067; B05D 7/24; B41M 1/22; B41M 5/00
See application file for complete search history.

(56) References Cited

U.S. PATENT DOCUMENTS

2019/0077963 A1* 3/2019 Schilling .................. A61K 8/72
2021/0284856 A1 9/2021 Takiguchi et al.

FOREIGN PATENT DOCUMENTS

| CN | 114806284 B | * | 8/2023 | ........... C09D 11/102 |
| EP | 2692806 A1 | | 2/2014 | |
| EP | 4036180 B1 | * | 12/2023 | ........... C09D 11/102 |
| JP | H03-074472 A | | 3/1991 | |
| JP | H10-130545 A | | 5/1998 | |
| JP | 2006-124464 A | | 5/2006 | |
| JP | 2012-251070 A | | 12/2012 | |
| JP | 2013-227454 A | | 11/2013 | |
| JP | 2015-189775 A | | 11/2015 | |
| WO | 2018-131445 A1 | | 7/2018 | |

* cited by examiner

*Primary Examiner* — Sophie Hon
(74) *Attorney, Agent, or Firm* — Harness, Dickey & Pierce, P.L.C.

(57) ABSTRACT

A metal pigment composition of the present disclosure is a coloring composition or a composition to be used for preparation of the coloring composition and includes: a metal pigment; a polyoxyalkyleneamine compound; and a liquid medium component, the metal pigment includes metal particles, the metal particles are surface-modified with a surface treatment agent, and the surface treatment agent is at least one selected from the group consisting of a compound represented by the following formula (1) and a compound represented by the following formula (2)

$$(A-R-O)_a P(O)(OH)_{3-a} \qquad (1)$$

$$(A-R)P(O)(OH)_2 \qquad (2).$$

13 Claims, No Drawings

METAL PIGMENT COMPOSITION AND COLORING METHOD

The present application is based on, and claims priority from JP Application Serial Number 2021-013533, filed Jan. 29, 2021, the disclosure of which is hereby incorporated by reference herein in its entirety.

BACKGROUND

1. Technical Field

The present disclosure relates to a metal pigment composition and a coloring method.

2. Related Art

Heretofore, as a method to produce an ornament having a glossy appearance, for example, a metal plating, a foil stamp printing using metal foil, or a thermal transfer using metal foil has been used.

However, the methods as described above are disadvantageously difficult to be applied, for example, to a curved portion.

On the other hand, a composition containing a pigment or a dye has bee used as an ink jet ink to be applied to a recording medium by an ink jet method or as a paint. The method as described above is excellent since the above composition can be preferably applied even to a curved portion.

However, when metal particles are simply used instead of using a pigment or a dye, a problem in that inherent characteristics, such as a glossy feeling, of the metal may not be sufficiently obtained may arise.

In order to solve the problem as described above, the use of metal particles surface-treated with a fluorine-based compound has been proposed (for example, see JP-A-2015-189775).

Although glossiness of a portion of a substrate to which a composition is adhered and dispersibility of metal particles in the composition may be improved to a certain extent, adhesion between the substrate to which the composition is applied and a colored portion formed using the composition may not be sufficiently improved, and hence, an abrasion resistance of a colored body produced using the composition is disadvantageously degraded.

SUMMARY

The present disclosure is made to solve the problem described above and can be realized as the following application examples.

According to one application example of the present disclosure, there is provided a metal pigment composition which is a coloring composition or a composition to be used for preparation of the coloring composition, the metal pigment composition comprising: a metal pigment; a polyoxyalkyleneamine compound; and a liquid medium component. In the metal pigment composition described above, the metal pigment includes metal particles, the metal particles are surface-modified with a surface treatment agent, and the surface treatment agent is at least one selected from the group consisting of a compound represented by the following formula (1) and a compound represented by the following formula (2).

$$(A-R-O)_a P(O)(OH)_{3-a} \quad (1)$$

$$(A-R)_a P(O)(OH)_{3-a} \quad (2)$$

In the formulas, A represents a hydrogen atom, a carboxy group, a hydroxy group, an amino group, or an oxyalkylene-containing group, R represents a divalent hydrocarbon group having 10 carbon atoms or more, and a represents 1 or 2.

In a metal pigment composition according to another application example of the present disclosure, the polyoxyalkyleneamine compound is a compound represented by the following formula (3) or its salt.

$$R^1-(O-R^2)_x-NH_2 \quad (3)$$

In the formula, $R^1$ represents a hydrogen atom or an alkyl group having 4 carbon atoms or less, $R^2$ represents an alkylene group having 5 carbon atoms or less, X represents an integer of 5 or more, and the polyoxyalkyleneamine compound may have at least two types of alkylene groups with different conditions of $R^2$ in its molecule.

In addition, in a metal pigment composition according to another application example of the present disclosure, the polyoxyalkyleneamine compound is a compound represented by the following formula (4) or its salt.

$$R^1-(OCH_2CH_2)_m-(OCH_2CH(CH_3))_n-NH_2 \quad (4)$$

In the formula, $R^1$ represents a hydrogen atom or an alkyl group having 4 carbon atoms or less, n and m each independently represent 0 or an integer of 1 or more, m+n represents an integer of 10 or more, and the order of the oxyethylene units and the oxypropylene units in the molecule of the polyoxyalkyleneamine compound is arbitrarily determined.

In addition, in a metal pigment composition according to another application example of the present disclosure, the polyoxyalkyleneamine compound has a weight average molecular weight of 400 to 8,000.

In addition, in a metal pigment composition according to another application example of the present disclosure, a content of the polyoxyalkyleneamine compound with respect to 100 parts by mass of the metal particles is 1.0 to 50 parts by mass.

In addition, in a metal pigment composition according to another application example of the present disclosure, the metal particles are composed of aluminum or an aluminum alloy.

In addition, in a metal pigment composition according to another application example of the present disclosure, the metal particles are in the form of scales.

In addition, a metal pigment composition according to another application example of the present disclosure is a solvent-based composition containing an organic solvent as the liquid medium component.

In addition, a metal pigment composition according to another application example of the present disclosure is an aqueous-based composition containing water as the liquid medium component.

In addition, in a metal pigment composition according to another application example of the present disclosure, a content of the surface treatment agent with respect to 100 parts by mass of the metal particles is 1.0 to 50 parts by mass.

In addition, a metal pigment composition according to another application example of the present disclosure is the coloring composition.

In addition, a metal pigment composition according to another application example of the present disclosure is an ink jet ink.

In addition, a coloring method according to still another application example of the present disclosure comprises a step of adhering the metal pigment composition according to the application example of the present disclosure to a substrate.

DESCRIPTION OF EXEMPLARY EMBODIMENTS

Hereinafter, preferable embodiments of the present disclosure will be described in detail.

[1] Metal Pigment Composition

First, a metal pigment composition of the present disclosure will be described.

Incidentally, heretofore, as a method to produce an ornament having a glossy appearance, for example, a metal plating, a foil stamp printing using metal foil, or a thermal transfer using metal foil has been used.

However, the methods as described above are disadvantageously difficult to be applied, for example, to a curved portion.

On the other hand, a composition containing a pigment or a dye has been used as an ink jet ink to be applied to a recording medium by an ink jet method or as a paint. The method as described above is excellent since the above composition can be preferably applied even to a curved portion.

However, when metal particles are simply used instead of using a pigment or a dye, a problem in that inherent characteristics, such as a glossy feeling, of the metal may not be sufficiently obtained may arise.

In order to solve the problem as described above, the use of metal particles surface-treated with a fluorine-based compound has been proposed. Accordingly, although the glossiness of a portion to which the composition is adhered is improved to a certain extent, the adhesion between a substrate to which the composition is applied and a colored portion formed using the composition may not be sufficiently improved, and hence, the abrasion resistance of a colored body produced using the composition is disadvantageously degraded. In addition, as a composition excellent not only in glossiness and abrasion resistance but also in dispersion stability, the composition described above cannot be sufficient.

Accordingly, through intensive research carried out to solve the problem described above, the present inventor achieved the present disclosure. That is, the metal pigment composition of the present disclosure is a coloring composition or a composition to be used for preparation of the coloring composition and includes a metal pigment, a polyoxyalkyleneamine compound, and a liquid medium component, the metal pigment includes metal particles, the metal particles are surface-modified with a surface treatment agent, and the surface treatment agent is at least one selected from the group consisting of a compound represented by the following formula (1) and a compound represented by the following formula (2).

$$(A\text{-}R\text{---}O)_a P(O)(OH)_{3-a} \quad (1)$$

$$(A\text{-}R)_a P(O)(OH)_{3-a} \quad (2)$$

In the formulas, A represents a hydrogen atom, a carboxy group, a hydroxy group, an amino group, or an oxyalkylene-containing group, R represents a divalent hydrocarbon group having 10 carbon atoms or more, and a represents 1 or 2.

Accordingly, a metal pigment composition can be provided which may be preferably applied to production of a colored body having, besides an excellent dispersion stability of the metal particles, an excellent glossy feeling and an excellent abrasion resistance. In particular, even when the metal pigment composition is applied to one of a solvent-based metal pigment composition and an aqueous-based metal pigment composition, the excellent advantages as described above can be obtained. In addition, since a fluorine-based surface treatment agent is not required, this metal pigment composition is also advantageous in terms of environmental conservation.

In addition, when the metal pigment composition is an ink jet composition to be ejected by an ink jet method, besides the advantages as described above, advantages, such as more preferable fine pattern formation and an excellent on-demand property, may also be obtained by using an ink jet method. In addition, for example, an ejection stability of liquid droplets within a relatively short time after production of the ink jet composition can be improved, and in addition, even when the ink jet composition is stored for a long time or is stored under severe conditions, for example, the ejection stability of the liquid droplets can be improved.

On the other hand, when the conditions described above are not satisfied, the results may not be satisfied.

For example, when the metal pigment composition includes no polyoxyalkyleneamine compound, the following problems may arise. That is, for example, even if the metal pigment is surface-modified with the surface treatment agent, when the metal pigment composition includes no polyoxyalkyleneamine compound, the metal pigment in the metal pigment composition is liable to be aggregated, the dispersion stability of the metal particles is degraded, and the glossy feeling of the colored body produced using the metal pigment composition is seriously degraded. In addition, when the aggregation of the metal pigment occurs, irregularity caused by the aggregates of the metal pigment is liable to be generated on the surface of the colored body produced using the metal pigment composition, and the abrasion resistance of the colored body is liable to be degraded.

In addition, when the dispersion stability is degraded, by the aggregates, the ejection stability is unfavorably degraded when the composition is ejected by an ink jet method.

In addition, even if the metal pigment composition includes the polyoxyalkyleneamine compound, when the metal particles are not surface-modified with the surface treatment agent or when the metal particles are surface-modified with a surface modification agent other than the compound represented by the above formula (1) and/or the compound represented by the above formula (2), the following problems may arise. That is, at least one of the dispersion stability of the metal particles in the metal pigment composition, the glossy feeling of the colored body produced using the metal pigment composition, and the abrasion resistance of the colored body produced using the metal pigment composition is degraded. In particular, when a fluorinated-based surface treatment agent is used instead of using the compound represented by the above formula (1) and/or the compound represented by the above formula (2), the abrasion resistance of the colored body produced using the metal pigment composition is liable to be particularly degraded. The reason for this is believed that since the fluorine-based treatment agent is excellent in leafing property, the metal pigment is liable to float on an upper layer of a coating film formed using the metal pigment composition.

In addition, in the following description, the at least one surface treatment agent selected from the group consisting of the compound represented by the above formula (1) and the compound represented by the above formula (2) is also called "specific surface treatment agent".

Hereinafter, constituent components of the metal pigment composition of the present disclosure will be described.

[1-1] Metal Pigment

The metal pigment composition of the present disclosure includes a metal pigment composed of metal particles.

The metal particles forming the metal pigment are surface-modified with a specific surface treatment agent which will be described later. In more particular, it is believed that since an OH group on the surface of the metal particle reacts with a part of a phosphorus-containing acid group of the specific surface treatment agent, the metal particle and the specific surface treatment agent are bonded to each other with a covalent bond or a hydrogen bond.

In the metal particle, at least part of the metal particle visually viewed from the outside thereof is formed from a metal material, and in general, the vicinity of an outer surface of the metal particle is formed from a metal material.

The metal particles are a component which has a significant influence on the appearance of the colored body produced using the metal pigment composition.

The metal particle may be a particle in which at least a region including the vicinity of the surface is formed from a metal material, and for example, the particle may be entirely formed from a metal material or may have a base portion formed from a non-metal material and a coating film formed from a metal material which covers the base portion. In addition, the metal particle may have an oxidized coating film, such as a passivation film, on its surface. Even by the metal particles as described above, the problems as described above occurred in the past; however, by using the present disclosure, the excellent advantages as described above can be obtained.

As the metal material forming the metal particles, elemental metals or various types of alloys may be used. For example, aluminum, silver, gold, platinum, nickel chromium, tin, zinc, indium, titanium, iron, or copper may be mentioned. Among those mentioned above, the metal particles are preferably formed from aluminum or an aluminum alloy. The reason aluminum or an aluminum alloy is preferable is a low specific gravity thereof compared to that of iron or the like. Accordingly, when the particles formed from aluminum or an aluminum alloy are dispersed in the metal pigment composition, sedimentation of the particles significantly slowly proceeds; hence, for example, while generation of density irregularity is prevented, the metal pigment composition can be stored for a longer time.

In addition, while an increase in production cost of the colored body produced using the metal pigment composition is suppressed, the glossy feeling and luxury feeling of the colored body can be particularly improved. Although aluminum and an aluminum alloy each have a specifically excellent glossy feeling among various types of metal materials, the present inventor found that when the particles formed from the material mentioned above are used for the metal pigment composition, the following problems may arise. That is, the present inventor found that the storage stability of the metal pigment composition is specifically degraded, and in addition, in particular, when the metal pigment composition as described above is used as an ink jet composition, problems, such as degradation in ejection stability due to an increase in viscosity caused by gelation, are specifically liable to occur. On the other hand, since the polyoxyalkyleneamine compound and the specific surface treatment agent are used together with the metal pigment, even if the particles formed from aluminum or an aluminum alloy are used, the problems as described above can be reliably prevented. That is, since the metal particles are formed from aluminum or an aluminum alloy, the advantages of the present disclosure can be more significantly obtained.

Although the metal particles may have any shapes, such as spherical, spindle, or needle shapes, particles having scale shapes are preferable.

Accordingly, on the substrate to which the metal pigment composition is applied, main surfaces of the metal particles can be disposed so as to be along the surface shape of the substrate. As a result, for example, the inherent glossy feeling of the metal material forming the metal particles can be more effectively obtained in the colored body thus obtained, and in addition, while the glossy feeling and the luxury feeling of the colored body can be specifically improved, the abrasion resistance thereof can also be specifically improved. In addition, in a metal pigment composition in which the polyoxyalkyleneamine compound and the specific surface treatment agent are not used in combination, when the metal particles have scale shapes, the storage stability of the metal pigment composition is specifically degraded, and when this metal pigment composition is used as an ink jet composition, the ejection stability of the ink jet composition is liable to be specifically degraded. In addition, for example, an excellent glossy feeling by the scale-shaped metal particles cannot be obtained.

On the other hand, when the metal pigment composition is a composition in which the metal particles are used together with the polyoxyalkyleneamine compound and the specific surface treatment agent, even if the metal particles have scale shapes, the problems as described above can be reliably prevented from being generated. That is, when the metal particles have scale shapes, the advantages of the present disclosure can be more significantly obtained.

In the present disclosure, the scale shape indicates a shape, such as a flat sheet shape or a curved sheet shape, in which when the particle is observed at a predetermined angle, for example, when the particle is viewed in plan, an area thereof viewed in plan is larger than an area of the particle viewed at an angle orthogonal to the above observation angle. In particular, when the particle is viewed in a direction in which a projection area thereof is maximized, that is, when the particle is viewed in plan, the area thereof is represented by $S_1$ [$\mu m^2$], and an area of the particle viewed in one direction among the directions orthogonal to the above observation direction in which the area thereof is maximized is represented by $S_0$ [$\mu m^2$]. In the case described above, $S_1/S_0$ is preferably 2 or more, more preferably 5 or more, even more preferably 8 or more, further preferably 10 or more, and even further preferably 20 or more. Although an upper limit of $S_1/S_0$ is not particularly limited, the upper limit described above is preferably 1,000, more preferably 500, and further preferably 100. In particular, as the value described above, for example, an average value obtained such that after arbitrary 50 particles are observed, the average is calculated therefrom may be used. The observation may be performed by an electron microscope or an atomic force microscope.

Alternatively, a volume average particle diameter (D50) which will be described later and an average thickness are used, and after the units thereof are made coincide with each other, the volume average particle diameter (D50)/the average thickness may be obtained as the range described above.

When the metal particles are in the form of scales, although a lower limit of the average thickness of the metal particles is not particularly limited, the lower limit described above is preferably 5 nm, more preferably 10 nm, and further preferably 15 nm. In addition, when the metal particles are in the form of scales, although an upper limit of the average thickness of the metal particles is not particularly limited, the upper limit described above is preferably 90 nm, more preferably 70 nm, and even more preferably 50 nm, further preferably 30 nm, and even further preferably 20 nm.

The average thickness may be measured using an atomic force microscope. Although the measurement method is not particularly limited, for example, the average thickness may be measured by an atomic force microscope method using NanoNavi E-Sweep (manufactured by SII Nano Technology Inc.). For example, arbitrary 50 metal particles are measured, and the average value thereof is used as the average thickness.

Accordingly, the advantages obtained by the scale-shaped particles as described above can be more significantly obtained.

Although a lower limit of the volume average particle diameter of the metal particles is not particularly limited, the lower limit described above is preferably 0.20 μm, more preferably 0.25 μm, and further preferably 0.30 μm. In addition, although an upper limit of the volume average particle diameter of the metal particles is not particularly limited, the upper limit described above is preferably 1.00 μm, more preferably 0.90 μm, and further preferably 0.80 μm.

Accordingly, while the storage stability, water resistance, and the like of the metal pigment composition are further improved, for example, generation of unfavorable density irregularity in the colored body produced using the metal pigment compositions is effectively prevented, and the glossy feeling and the abrasion resistance of the colored body can be further improved.

In addition, in the present disclosure, the volume average particle diameter indicates the median diameter of a volume distribution of a particle dispersion liquid measured using a laser diffraction/scattering method and is the size of the particles at a central cumulative value of 50%, that is, is the size of the particles obtained when the existence ratios of particles having individual sizes thus measured are cumulated to 50%. When the metal particles are in the form of scales, the volume average particle diameter thereof is to be obtained based on the shapes and the sizes of the metal particles which are assumed to have sphere shapes.

In addition, an upper limit of a particle diameter D90 from a fine particle side of the metal particles contained in the metal pigment composition to a volume cumulative distribution of 90% is preferably 1.50 μm, more preferably 1.20 μm, and further preferably 0.95 μm.

Accordingly, while the storage stability, the water resistance, and the like of the metal pigment composition are further improved, the generation of unfavorable density irregularity in the colored body produced using the metal pigment composition is more effectively prevented, and the glossy feeling and the abrasion resistance of the colored body can be further improved.

Although a lower limit of a content of the metal particles in the metal pigment composition is not particularly limited, the lower limit described above is preferably 0.1 percent by mass, more preferably 0.2 percent by mass, and further preferably 0.3 percent by mass. In addition, although an upper limit of the content of the metal particles in the metal pigment composition is not particularly limited, the upper limit described above is preferably 30 percent by mass, more preferably 20 percent by mass, and even more preferably 15 percent by mass, further preferably 10 percent by mass, and even further preferably 5 percent by mass.

Accordingly, while the storage stability, the water resistance, and the like of the metal pigment composition are further improved, the glossy feeling and the abrasion resistance of the colored body produced using the metal pigment composition can be significantly improved.

In particular, when the metal pigment composition is an ink itself to be ejected by an ink jet method, although a lower limit of a content of the metal particles in the ink is not particularly limited, the lower limit described above is preferably 0.1 percent by mass, more preferably 0.2 percent by mass, and further preferably 0.3 percent by mass. In addition, when the metal pigment composition is an ink itself to be ejected by an ink jet method, although an upper limit of the content of the metal particles in the ink is not particularly limited, the upper limit described above is preferably 2.4 percent by mass, more preferably 2.2 percent by mass, and further preferably 1.8 percent by mass.

In addition, when the metal pigment composition is a paint or an undiluted solution to be used for preparation of an ink, a paint, or the like, although a lower limit of the content of the metal particles in the metal pigment composition is not particularly limited, the lower limit described above is preferably 2.0 percent by mass, more preferably 2.5 percent by mass, and further preferably 3.0 percent by mass. In addition, when the metal pigment composition is a paint or an undiluted solution to be used for preparation of an ink to be ejected by an ink jet method, although an upper limit of the content of the metal particles in the metal pigment composition is not particularly limited, the upper limit described above is preferably 30 percent by mass, more preferably 20 percent by mass, even more preferably 15 percent by mass, and further preferably 10 percent by mass.

Although the metal particles may be produced by any method, when the metal particles are formed from Al, particles are preferably obtained such that a film is formed from Al by a vapor phase film formation method and is then pulverized. Accordingly, at the colored portion formed using the metal pigment composition of the present disclosure, for example, the inherent glossy feeling of Al can be more effectively expressed. In addition, variation in characteristics between the particles can be suppressed. In addition, by the method described above, even relatively thin metal particles can be preferably produced.

When the metal particles are produced by the method as described above, for example, by forming a film from Al on a base material, the metal particles can be preferably produced. As the base material described above, for example, a plastic film formed from a poly(ethylene terephthalate) or the like may be used. In addition, the base material may have a release agent layer on its film surface.

In addition, the pulverization described above is preferably performed in a liquid by applying ultrasonic vibration to the film described above. Accordingly, metal particles having the particle diameters as described later can be easily and reliably obtained, and in addition, variation in size, shape, and characteristics between the metal particles can be suppressed from being generated.

In addition, when the pulverization is performed by the method described above, as the liquid described above, for example, an alcohol, a hydrocarbon-based compound, an ether-based compound, or a polar compound, such as propylene carbonate, γ-butyrolactone, N-methy-2-pyrrolidone, N,N-dimethylformamide, N,N-dimethylacetamide, dimethylsulfoxide, cyclohexanone, or acetonitrile, may be preferably used. Since the solvent as described above is used, for example, while unfavorable oxidation of the metal particles is prevented, the productivity of the metal particles is particularly improved, and in addition, the variation in size, shape, and characteristics between the metal particles can be significantly suppressed.

As the alcohol, for example, methanol, ethanol, propanol, or butanol may be mentioned. As the hydrocarbon-based compound, for example, n-heptane, n-octane, decane, dodecane, tetradecane, toluene, xylene, cymene, durene, indene, dipentene, tetrahydronaphthalene, decahydronaphthalene, or cyclohexylbenzene may be mentioned. In addition, as the ether-based compound, for example, there may be mentioned ethylene glycol dimethyl ether, ethylene glycol diethyl ether, ethylene glycol methyl ethyl ether, diethylene glycol dimethyl ether, diethylene glycol diethyl ether, tetraethylene glycol monobutyl ether, diethylene glycol methyl ethyl ether, diethylene glycol monobutyl ether acetate, diethylene glycol n-butyl ether, tripropylene glycol dimethyl ether, triethylene glycol diethyl ether, 1,2-dimethoxyethane, bis(2-methoxyethyl)ether, p-dioxane, or tetrahydrofuran.

[1-2] Polyoxyalkyleneamine Compound

The metal pigment composition of the present disclosure includes a polyoxyalkyleneamine compound.

Although the polyoxyalkyleneamine compound is not particularly limited as long as being an amine compound having a polyoxyalkylene structure in its molecule, a compound represented by the following formula (3) or its salt is preferable.

$$R^1-(O-R^2)_x-NH_2 \quad (3)$$

In the above formula, $R^1$ represents a hydrogen atom or an alkyl group having 4 carbon atoms or less, $R^2$ represents an alkylene group having 5 carbon atoms or less, X represents an integer of 5 or more, and the polyoxyalkyleneamine compound may have at least two types of alkylene groups with different conditions of $R^2$ in its molecule.

Accordingly, the dispersion stability of the metal particles in the metal pigment composition and the glossy feeling and the abrasion resistance of the colored body produced using the metal pigment composition can be further improved. In addition, when the metal pigment composition is an ink jet composition, the ejection stability of this ink jet composition, in particular, the ejection stability thereof when the ink jet composition is stored for a long time or is stored under severe conditions, can be further improved.

As described above, the polyoxyalkyleneamine compound is preferably a compound represented by the above formula (3) or its salt.

In the above formula (3), $R^1$ represents preferably an alkyl group having 4 carbon atoms or less and more preferably an alkyl group having 1 or 2 carbon atoms. $R^2$ preferably represents an alkylene group having 1 to 3 carbon atoms and may be either a linear or a branched alkylene group.

Among compounds each represented by the above formula (3) or salts thereof, as the polyoxyalkyleneamine compound, a compound represented by the following formula (4) or its salt is particularly preferable.

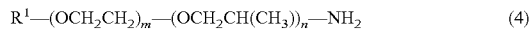

$$R^1-(OCH_2CH_2)_m-(OCH_2CH(CH_3))_n-NH_2 \quad (4)$$

in the above formula, $R^1$ represents a hydrogen atom or an alkyl group having 4 carbon atoms or less, n and m each independently represent 0 or an integer of 1 or more, m+n represents an integer of 10 or more, and the order of the oxyethylene units and the oxypropylene units in the molecule of the polyoxyalkyleneamine compound may be arbitrarily determined.

Accordingly, the advantages described above can be further significantly obtained.

In addition, a lower limit of an m/n value which is the ratio of m to n in the above formula (4), that is, the lower limit of the ratio of the numbers of the oxyethylene units to the numbers of the oxypropylene units in the molecule of the polyoxyalkyleneamine compound, is preferably 0.05, more preferably 0.15, and further preferably 0.70. In addition, an upper limit of the m/n value is preferably 10.0, more preferably 9.5, and further preferably 9.0.

Accordingly, the dispersion stability of the metal particles in the metal pigment composition and the glossy feeling and the abrasion resistance of the colored body produced using the metal pigment composition can be further improved. In addition, when the metal pigment composition is an ink jet composition, the ejection stability of the ink jet composition, in particular, the ejection stability thereof when the ink jet composition is stored for a long time or is stored under severe conditions, can be further improved.

As described above, the order of the oxyethylene units and the oxypropylene units in the above formula (4) is not particularly limited. In more particular, in the above formula (4), although the amino group is bonded to one terminal of the continuous oxyethylene units, and the methyl group is bonded to one terminal of the continuous oxypropylene units, the amino group may be bonded to one terminal of the continuous oxypropylene units, and the methyl group may be bonded to one terminal of the continuous oxyethylene units. In addition, the compound represented by the above formula (4) may be either a block copolymer or a random copolymer.

Although a lower limit of the weight average molecular weight of the polyoxyalkyleneamine compound is not particularly limited, the lower limit described above is preferably 400, more preferably 500, even more preferably 600, and further preferably 1,000. In addition, although an upper limit of the weight average molecular weight of the polyoxyalkyleneamine compound is not particularly limited, the upper limit described above is preferably 8,000, more preferably 5,000, and further preferably 3,000.

Accordingly, the dispersion stability of the metal particles in the metal pigment composition and the glossy feeling and the abrasion resistance of the colored body produced using the metal pigment composition can be further improved. In addition, when the metal pigment composition is an ink jet composition, the ejection stability of the ink jet composition, in particular, the ejection stability thereof when the ink jet composition is stored for a long time or is stored under severe conditions, can be further improved.

The metal pigment composition of the present disclosure may include at least two types of compounds as the polyoxyalkyleneamine compound.

Although a lower limit of a content of the polyoxyalkyleneamine compound in the metal pigment composition is not particularly limited, the lower limit described above is preferably 0.005 percent by mass, more preferably 0.007 percent by mass, even more preferably 0.01 percent by mass, further preferably 0.02 percent by mass, and even further preferably 0.03 percent by mass. In addition, although an upper limit of the content of the polyoxyalkyleneamine compound in the metal pigment composition is not particularly limited, the upper limit described above is preferably 5.0 percent by mass, more preferably 3.0 percent by mass, even more preferably 2.0 percent by mass, and further preferably 1.5 percent by mass. The upper limit and the lower limit described above are also preferably set in the ranges described below.

Accordingly, the dispersion stability of the metal particles in the metal pigment composition and the glossy feeling and the abrasion resistance of the colored body produced using the metal pigment composition can be further improved. In addition, when the metal pigment composition is an ink jet composition, the ejection stability of the ink jet composition, in particular, the ejection stability thereof when the ink jet composition is stored for a long time or is stored under severe conditions, can be further improved.

In particular, when the metal pigment composition is an ink itself to be ejected by an ink jet method, although a lower limit of a content of the polyoxyalkyleneamine compound in the ink is not particularly limited, the lower limit described above is preferably 0.005 percent by mass, more preferably 0.007 percent by mass, even more preferably 0.01 percent by mass, further preferably 0.02 percent by mass, and even further preferably 0.03 percent by mass. In addition, when the metal pigment composition is an ink itself to be ejected by an ink jet method, although an upper limit of the content of the polyoxyalkyleneamine compound in the ink is not particularly limited, the upper limit described above is preferably 1.0 percent by mass, more preferably 0.70 percent by mass, even more preferably 0.50 percent by mass, and particularly preferably 0.40 percent by mass.

In addition, when the metal pigment composition is a paint or an undiluted solution to be used for preparation of an ink, a paint, or the like, although a lower limit of the content of the polyoxyalkyleneamine compound in the metal pigment composition is not particularly limited, the lower limit described above is preferably 0.025 percent by mass, more preferably 0.035 percent by mass, even more preferably 0.05 percent by mass, further preferably 0.10 percent by mass, and even further preferably 0.20 percent by mass. In addition, when the metal pigment composition is a paint or an undiluted solution to be used for preparation of an ink to be ejected by an ink jet method, although an upper limit of the content of the polyoxyalkyleneamine compound in the metal pigment composition is not particularly limited, the upper limit described above is preferably 5.0 percent by mass, more preferably 3.5 percent by mass, even more preferably 3.0 percent by mass, further preferably 2.0 percent by mass, and even further preferably 1.5 percent by mass.

A lower limit of the content of the polyoxyalkyleneamine compound in the metal pigment composition with respect to 100 parts by mass of the metal particles is preferably 0.5 parts by mass, more preferably 0.7 parts by mass, even more preferably 1.0 part by mass, further preferably 1.5 parts by mass, and even further preferably 2.0 parts by mass. In addition, an upper limit of the content of the polyoxyalkyleneamine compound in the metal pigment composition with respect to 100 parts by mass of the metal particles is preferably 100 parts by mass, more preferably 70 parts by mass, even more preferably 50 parts by mass, further preferably 40 parts by mass, even further preferably 30 parts by mass, and particularly preferably 20 parts by mass.

Accordingly, the dispersion stability of the metal particles in the metal pigment composition and the glossy feeling and the abrasion resistance of the colored body produced using the metal pigment composition can be further improved. In addition, when the metal pigment composition is an ink jet composition, the ejection stability of the ink jet composition, in particular, the ejection stability thereof when the ink jet composition is stored for a long time or is stored under severe conditions, can be further improved.

[1-3] Liquid Medium Component

The metal pigment composition of the present disclosure includes a liquid medium component.

The liquid medium component itself is a component in the form of liquid, and in the metal pigment composition of the present disclosure, the liquid medium component has a primary function as a dispersion medium to disperse the metal particles. In addition, the liquid medium component enables the composition to easily adhere to the substrate.

In addition, since the metal pigment composition includes the liquid medium component, when the metal pigment composition is an ink itself to be ejected by an ink jet method, the ink can be ejected by an ink jet method.

As the liquid medium component, for example, water and various types of organic solvents may be mentioned.

When the metal pigment composition of the present disclosure is a solvent-based composition which contains an organic solvent as the liquid medium component, the dispersion stability of the metal particles in the metal pigment composition and the glossy feeling and the abrasion resistance of the colored body produced using the metal pigment composition can be further improved.

In addition, when the metal pigment composition of the present disclosure is an aqueous-based composition which contains water as the liquid medium component, while the dispersion stability of the metal particles in the metal pigment composition and the glossy feeling and the abrasion resistance of the colored body produced using the metal pigment composition can be further improved, the environmental load of the metal pigment composition can be further reduced.

As the organic solvent contained in the metal pigment composition of the present disclosure, for example, an alcohol, a hydrocarbon-based compound, an ether-based compound, a ketone, an ester, or a polar solvent, such as propylene carbonate, N-methy-2-pyrrolidone, N,N-dimethylformamide, N,N-dimethylacetamide, dimethylsulfoxide, cyclohexanone, or acetonitrile, may be preferably used.

As the alcohol, for example, a monovalent alcohol, such as methanol, ethanol, propanol, isopropyl alcohol, or butanol; or a polyvalent alcohol, such as ethylene glycol, propylene glycol, or 1,2-hexanediol, may be mentioned. In addition, as the hydrocarbon-based compound, for example, n-heptane, n-octane, decane, dodecane, tetradecane, toluene, xylene, cymene, durene, indene, dipentene, tetrahydronaphthalene, decahydronaphthalene, or cyclohexylbenzene may be mentioned. In addition, as the ether-based compound, for example, a glycol ether may be mentioned. As the glycol ether, for example, there may be mentioned ethylene glycol dimethyl ether, ethylene glycol diethyl ether, ethylene glycol methyl ethyl ether, diethylene glycol dimethyl ether, diethylene glycol diethyl ether, tetraethylene glycol monobutyl ether, diethylene glycol methyl ethyl ether, diethylene glycol monobutyl ether acetate, diethylene glycol n-butyl ether, tripropylene glycol dimethyl ether, triethylene glycol diethyl ether, 1,2-dimethoxyethane, or bis(2-methoxyethyl)ether. As the ether, besides those mentioned above, for example, p-dioxane or tetrahydrofuran may also be mentioned. In addition, as the ketone, for example, acetone, methyl ethyl ketone, or diethyl ketone may be mentioned. In addition, as the ester, for example, ethyl acetate, propyl acetate, or butyl acetate may be mentioned. As the ester, for example, a cyclic ester may also be mentioned. As the cyclic ester, for example, a lactone, such as γ-butyrolactone, may be mentioned.

When the metal pigment composition of the present disclosure is a solvent-based composition, the organic solvent includes preferably at least one selected from the group consisting of an ether, an ester, a ketone, and an alcohol, more preferably at least one selected from the group consisting of an ether and an ester, even more preferably at least one selected from the group consisting of a glycol ether and a cyclic ester, and particularly preferably a glycol ether.

In particular, at least one selected from the group consisting of diethylene glycol diethyl ether, tetraethylene glycol monobutyl ether, and γ-butyrolactone is further preferably contained.

Accordingly, the dispersion stability of the metal particles in the metal pigment composition and the glossy feeling and the abrasion resistance of the colored body produced using the metal pigment composition can be further improved. In addition, a moisture retaining property of the metal pigment composition can be improved, and for example, when the metal pigment composition is an ink jet ink, unfavorable precipitation of a solid component of the metal pigment composition caused, for example, by drying at an ink jet head or the like can be effectively prevented. In addition, the viscosity of the metal pigment composition can be more preferably adjusted.

In particular, when the metal pigment composition of the present disclosure is a solvent-based composition which contains an organic solvent as a primary liquid medium component, a rate of the organic solvent occupied in all liquid medium components forming the metal pigment composition of the present disclosure is preferably 50 percent by mass or more, more preferably 60 percent by mass or more, further preferably 70 percent by mass or more. An upper limit of the organic solvent is 100 percent by mass or less.

Accordingly, the advantages described above can be more significantly obtained.

When the metal pigment composition of the present disclosure is a solvent-based composition, a content of water occupied in all the liquid medium components is preferably less than 30 percent by mass. Furthermore, the content of water occupied in all the liquid medium components is preferably sufficiently low, and in particular, the content described above is preferably 5.0 percent by mass or less, more preferably 1.0 percent by mass or less, and further preferably 0.1 percent by mass or less.

When the metal pigment composition of the present disclosure is an aqueous-based composition which contains water as a primary liquid medium component, as the liquid medium component, an organic solvent may also be contained together with the water.

When the metal pigment composition of the present disclosure is an aqueous-based composition, a rate of the organic solvent occupied in all liquid medium components is preferably less than 50 percent by mass, more preferably 40 percent by mass or less, and further preferably 30 percent by mass or less. A lower limit of the organic solvent is 0 percent by mass or more and may also be 10 percent by mass or more.

When the metal pigment composition of the present disclosure is an aqueous-based composition, as the organic solvent contained together with the water, a liquid component having a solubility to water, that is, a water-soluble organic solvent, is preferable.

Accordingly, the dispersion stability of the metal particles in the metal pigment composition and the glossy feeling and the abrasion resistance of the colored body produced using the metal pigment composition can be further improved. In addition, the moisture retaining property of the metal pigment composition can be improved, and for example, when the metal pigment composition is an ink jet ink, the unfavorable precipitation of the solid component of the metal pigment composition caused, for example, by drying at an ink jet head or the like can be effectively prevented. In addition, the viscosity of the metal pigment composition can be more preferably adjusted.

Although the water-soluble organic solvent may be a water-soluble liquid component, for example, a liquid component having a solubility to water at 25° C. of at least 2 g/100 g is preferably used.

The water-soluble organic solvent preferably has a boiling point of 110° C. to 300° C. at one atmospheric pressure.

Accordingly, the moisture retaining property of the metal pigment composition can be further improved, and for example, when the metal pigment composition is an ink jet ink, the unfavorable precipitation of the solid component of the metal pigment composition caused, for example, by drying at an ink jet head or the like can be effectively prevented. As a result, the ejection stability of the metal pigment composition by an ink jet method can be further improved. In addition, after the metal pigment composition is ejected, if needed, the water-soluble organic solvent can be relatively easily evaporated, and hence, the liquid medium component can be effectively prevented from unfavorably remaining in the colored body produced using the metal pigment composition.

When the metal pigment composition of the present disclosure is an aqueous-based composition, as the water-soluble organic solvent contained together with the water, for example, a polyol, such as glycerin, having at least three functional groups, a glycol, a glycol monoether, a lactam, or a monovalent alcohol may be mentioned, and those mentioned above may be used either alone or in combination.

As the glycol, for example, ethylene glycol, diethylene glycol, triethylene glycol, propylene glycol, or 1,2-hexandiol may be mentioned. In addition, as the glycol monoether, for example, triethylene glycol monobutyl ether may be mentioned. In addition, as the lactam, for example, 2-pyrrolidone may be mentioned. In addition, as the monovalent alcohol, for example, ethanol, methanol, propanol, isopropyl alcohol, butanol, or phenoxyethanol may be mentioned.

When the metal pigment composition of the present disclosure is an aqueous-based composition, a rate of the water occupied in all the liquid medium components forming the metal pigment composition of the present disclosure is preferably 30 percent by mass or more, more preferably 40 percent by mass or more, even more preferably 50 percent by mass or more, and further preferably 55 percent by mass or more. When the metal pigment composition of the present disclosure is an aqueous-based composition, an upper limit of the water occupied in all the liquid medium components forming the metal pigment composition of the present disclosure is 100 percent by mass.

Although a lower limit of a content of the liquid medium component in the metal pigment composition of the present disclosure is not particularly limited, for example, the lower limit described above is preferably 60.0 percent by mass, more preferably 70.0 percent by mass, and further preferably 75.0 percent by mass. In addition, although an upper limit of the content of the liquid medium component in the metal pigment composition of the present disclosure is not particularly limited, for example, the upper limit described above is preferably 99.7 percent by mass, more preferably 99.5 percent by mass, and further preferably 99.0 percent by mass.

Accordingly, the viscosity of the metal pigment composition can be made more preferable.

[1-4] Specific Surface Treatment Agent

The metal particles described above are surface-modified with a specific surface treatment agent.

The specific surface treatment agent is at least one selected from the group consisting of the compound represented by the above formula (1) and the compound represented by the above formula (2).

In the formula, A represents a hydrogen atom, a carboxy group, a hydroxy group, an amino group, or an oxyalkylene-containing group, R represents a divalent hydrocarbon group having 10 carbon atoms or more, and a represents 1 or 2.

When A represents a hydrogen atom, a part of R bonded to A which is a hydrogen atom is counted as monovalent, and hence, R is a divalent hydrocarbon group.

The specific surface treatment agent may be used alone, or at least two types thereof may be used in combination. When at least two types thereof are selected, at least one may be selected from compounds each represented by the formula (1), and at least one may be selected from compounds each represented by the formula (2). In addition, the above A's, R's, and a's may be independently selected for the respective compounds.

Although A's in the above formulas (1) and (2) are each a hydrogen atom, a carboxy group, a hydroxy group, an amino group, or an oxyalkylene-containing group, when the metal pigment composition of the present disclosure is a solvent-based composition, a hydrogen atom is preferable, and when the metal pigment composition of the present disclosure is an aqueous-based composition, a carboxy group, a hydroxy group, an amino group, or an oxyalkylene-containing group is preferable.

That is, (A-R) represents a hydrocarbon group substituted by one of a carboxy group, a hydroxy group, an amino group, and an oxyalkylene-containing group or an unsubstituted hydrocarbon group.

Accordingly, the dispersion stability of the metal particles in the metal pigment composition and the glossy feeling and the abrasion resistance of the colored body produced using the metal pigment composition can be further improved.

When A's in the above formulas (1) and (2) each represent an oxyalkylene-containing group, A represents a group having an oxyalkylene structure. The oxyalkylene structure is also called an alkylene oxide structure. The oxyalkylene-containing group has at least one alkylene oxide unit and may have at least two alkylene oxide units. In particular, the oxyalkylene-containing group has a plurality of alkylene oxide units and may form the structure in which the units are repeatedly arranged. When A has a repeating structure of the alkylene oxide units, the number of the alkylene oxide units, that is, the number of the repeating alkylene oxide units, in A is preferably 10 or less and more preferably 4 or less. A lower limit thereof is 1 or more, preferably 2 or more, and more preferably 3 or more. The number of carbon atoms of the alkylene in the alkylene oxide unit is preferably 1 to 4.

Although R's in the above formulas (1) and (2) each represent a divalent hydrocarbon group having 10 carbon atoms or more, a divalent hydrocarbon group having 10 to 30 carbon atoms is preferable. Furthermore, the hydrocarbon group has preferably 12 to 28 carbon atoms, more preferably 13 to 25 carbon atoms, further preferably 14 to 25 carbon atoms, and particularly preferably 15 to 25 carbon atoms.

Accordingly, the dispersion stability of the metal particles in the metal pigment composition can be improved. In addition, a lubricity of the specific surface treatment agent itself can also be further improved. As a result, the abrasion resistance and the glossy feeling of the colored body produced using the metal pigment composition can be further improved.

As the divalent hydrocarbon group described above, for example, an alkylene group, an alkenylene group, or an alkynylene group may be mentioned.

The metal pigment composition of the present disclosure may contain, as the specific surface treatment agent, at least two types of compounds. In the case as described above, the same metal particles may be surface-treated with at least two types of specific surface treatment agents. In addition, the metal pigment composition of the present disclosure may include, as the metal particles, at least two types of metal particles surface-treated with specific surface treatment agents different from each other.

The surface treatment of the metal particles with the specific surface treatment agent may be performed such that for example, when a metal-made film formed by a vapor phase film forming method is pulverized in a liquid into metal particles as described above, the specific surface treatment agent is contained in the liquid described above.

When the surface treatment is performed on the same metal particles with at least two types of specific surface treatment agents, the surface treatment may be performed by a plurality of steps corresponding to the number of the at least two types of specific surface treatment agents or may be performed in the same step using the at least two types of specific surface treatment agents.

In addition, the surface treatment with the specific surface treatment agent may be performed in the same step as that for the treatment by the polyoxyalkyleneamine compound or may be performed in a step different therefrom. The surface treatment with the specific surface treatment agent may be performed before or after the step of the treatment by the polyoxyalkyleneamine compound.

When the content of the polyoxyalkyleneamine compound in the metal pigment composition and a content of the specific surface treatment agent in the metal pigment composition are represented by XA [percent by mass] and XP [percent by mass], respectively, a lower limit of XA/XP is preferably 0.02, more preferably 0.05, and further preferably 0.07. In addition, an upper limit of XA/XP is preferably 10.0, more preferably 7.0, and further preferably 5.0. In addition, the upper limit described above is further preferably 3.0, even further preferably 2.0, and particularly preferably 1.5.

Accordingly, the dispersion stability of the metal particles in the metal pigment composition and the glossy feeling and the abrasion resistance of the colored body produced using the metal pigment composition can be further improved.

Although a lower limit of the content of the specific surface treatment agent in the metal pigment composition is not particularly limited, the lower limit described above is preferably 0.01 percent by mass, more preferably 0.03 percent by mass, and further preferably 0.05 percent by mass. In addition, although an upper limit of the content of the specific surface treatment agent in the metal pigment composition is not particularly limited, the upper limit described above is preferably 10 percent by mass, more preferably 7.0 percent by mass, and further preferably 5.0 percent by mass.

Accordingly, the dispersion stability of the metal particles in the metal pigment composition and the glossy feeling and the abrasion resistance of the colored body produced using the metal pigment composition can be further improved.

In particular, when the metal pigment composition is an ink itself to be ejected by an ink jet method, although a lower limit of a content of the specific surface treatment agent in the ink is not particularly limited, the lower limit described above is preferably 0.01 percent by mass, more preferably 0.03 percent by mass, and further preferably 0.05 percent by mass. In addition, when the metal pigment composition is an ink itself to be ejected by an ink jet method, although an upper limit of the content of the specific surface treatment agent in the ink is not particularly limited, the upper limit described above is preferably 1.5 percent by mass, more preferably 1.0 percent by mass, and further preferably 0.8 percent by mass.

In addition, when the metal pigment composition is a paint or an undiluted solution to be used for preparation of an ink or a paint, although a lower limit of the content of the specific surface treatment agent in the metal pigment composition is not particularly limited, the lower limit described above is preferably 0.50 percent by mass, more preferably 0.70 percent by mass, and further preferably 1.0 percent by mass. In addition, when the metal pigment composition is a paint or an undiluted solution to be used for preparation of an ink to be ejected by an ink jet method, although an upper limit of the content of the specific surface treatment agent in the metal pigment composition is not particularly limited, the upper limit described above is preferably 10 percent by mass, more preferably 7.0 percent by mass, and further preferably 5.0 percent by mass.

Although the content of the specific surface treatment agent in the metal pigment composition is not particularly limited, the content described above with respect to 100 parts by mass of the metal particles is preferably 1.0 to 50 parts by mass, more preferably 1.5 to 40 parts by mass, and further preferably 2.0 to 30 parts by mass.

Accordingly, the dispersion stability of the metal particles in the metal pigment composition and the glossy feeling and the abrasion resistance of the colored body produced using the metal pigment composition can be further improved. In addition, when the metal pigment composition is an ink jet composition, the ejection stability of the ink jet composition, in particular, the ejection stability thereof when the ink jet composition is stored for a long time or is stored under severe conditions, can be further improved.

[1-5] Other Components

The metal pigment composition of the present disclosure may include components other than those described above. Hereinafter, the components as described above are also called the other components. As the components described above, for example, there may be mentioned a surface treatment agent other than the specific surface treatment agent, a leveling agent, a binder, a polymerization promoter, a polymerization inhibitor, a photopolymerization initiator, a dispersant, a surfactant, a penetration enhancer, a moisturizing agent, a colorant, a fixing agent, a fungicide, an antiseptic agent, an antioxidant, a chelating agent, a thickener, and/or a photosensitizer.

Although the binder is not particularly limited as long as being a resin, for example, an acrylic resin, an ester resin, an urethane resin, or a cellulose resin is preferably mentioned.

As the surfactant, for example, a silicone-based surfactant or an acetylene glycol-based surfactant is preferably mentioned.

However, a content of the other components in the metal pigment composition of the present disclosure is preferably 5.0 percent by mass or less, more preferably 3.0 percent by mass or less, and further preferably 2.0 percent by mass or less.

[1-6] Others

The metal pigment composition of the present disclosure is a coloring composition or a composition to be used for preparation of the coloring composition.

The coloring composition is, for example, a composition directly used to form a colored portion. That is, the coloring composition is a composition to be adhered to an object to be colored (hereinafter, simply referred to as "object" in some cases) for coloration thereof. That is, in a coloring method which will be described later, the coloring composition is a composition to be used in an adhesion step.

In this case, as the coloring composition, for example, an ink or a paint may be mentioned. Although the ink is not particularly limited, for example, an ink jet ink may be mentioned.

The composition to be used for preparation of the coloring composition is not directly used in the adhesion step in the coloring method which will be described later but is used for preparation of the coloring composition, and the coloring composition thus prepared is used in the coloring method. That is, after the composition described above is mixed with other components for density adjustment or the like to prepare the coloring composition, the coloring composition thus prepared is then used to form the colored portion.

In the case described above, as the composition to be used for preparation of the coloring composition, for example, a pigment dispersion liquid or an undiluted solution may be mentioned.

In particular, when the metal pigment composition of the present disclosure is the coloring composition, the metal pigment composition described above can be directly applied to the production of the colored body without performing the composition preparation and the density adjustment by dilution or the like.

The coloring composition is a composition to be adhered to the substrate for coloration thereof. As the coloring composition, for example, an ink or a paint may be mentioned. Although the ink is not particularly limited, for example, an ink jet ink may be mentioned.

In particular, the metal pigment composition is preferably an ink jet ink.

Heretofore, when a metal pigment composition is tried to be applied to an ink jet method, there have been problems in that the ejection stability by an ink jet method and the glossy feeling and the abrasion resistance of the colored body to be produced are liable to be degraded. However, according to the present disclosure, the generation of the problems as described above can be effectively prevented. That is, when the metal pigment composition is an ink jet ink, the advantages of the present disclosure can be more significantly obtained.

The ink jet ink is an ink to be ejected from an ink jet head by an ink jet method and is used for recording.

The substrate is a material to be colored by adhesion of the coloring composition, that is, the substrate is the object to be colored. When the coloring composition is an ink, the substrate is generally a recording medium. Although the substrate is not particularly limited, for example, besides the recording medium, a plate, a wall, a floor, a fence, a barrier, an automobile, and other articles may be mentioned.

As the recording medium, either an absorptive or a non-absorptive medium may be used, and for example, paper, such as regular paper or ink jet exclusive paper; a plastic material, a metal, a ceramic, a wood, a shell, natural fibers/artificial fibers, such as cotton, polyester, or wool fibers, or a non-woven cloth may be used, and a non-colored body is preferable. In addition, the shape of the recording medium is not particularly limited, and any shape, such as a sheet, may be used.

As the recording medium formed from a plastic material, for example, a plastic film or a plastic sheet may be mentioned. The plastic is not particularly limited, and for example, a poly(vinyl chloride), a polyester, or a polyolefin may be mentioned. As the polyester, for example, a poly(ethylene terephthalate) may be mentioned.

The composition to be used for preparation of the coloring composition is a composition to obtain the coloring composition by being mixed with other components necessary for the coloring composition. The composition to be used for preparation of the coloring composition is also called a pigment dispersion liquid or a pigment dispersion body each of which is used for preparation of the coloring composition. Hence, a content of the metal pigment in the composition to be used for preparation of the coloring composition is larger than the content of the metal pigment in the coloring composition obtained from the composition used for preparation of the coloring composition.

Although an upper limit of the viscosity of the metal pigment composition of the present disclosure measured at 25° C. using a rotational viscometer in accordance with JIS Z8809 is not particularly limited, the upper limit described above is preferably 25 mPa·s and more preferably 15 mPa·s. In addition, although a lower limit of the viscosity of the metal pigment composition of the present disclosure measured as described above is not particularly limited, the lower limit described above is preferably 1.5 mPa·s.

Accordingly, for example, when the metal pigment composition is an ink to be ejected by an ink jet method, liquid droplets of the ink described above can be more preferably ejected by an ink jet method.

[2] Coloring Method

Next, a coloring method of the present disclosure will be described.

The coloring method of the present disclosure includes a step (adhesion step) of adhering the metal pigment composition of the present disclosure used as the coloring composition to the substrate which is the object to be colored.

Accordingly, a coloring method which can be applied to the production of a colored body excellent in glossy feeling and abrasion resistance can be provided.

The step of adhering the metal pigment composition of the present disclosure to the substrate may be performed by various types of printing methods, such as an ink jet method, and various types of coating methods using a bar coater, a spray, a roll coater, a brush, and the like.

When the coloring composition is an ink, the coloring method is also a recording method.

When the metal pigment composition is ejected by an ink jet method, as the ink jet method, for example, although a piezoelectric method, a method in which an ink is ejected by bubbles generated by heating the ink, or the like may be used, for example, since the metal pigment composition is not likely to deteriorate, the piezoelectric method is preferable.

The ejection of the metal pigment composition by an ink jet method may be performed using a known liquid droplet ejection device.

The colored portion formed by the metal pigment composition may be a portion having, for example, a predetermined pattern or may be formed over the entire surface of the substrate.

[3] Colored Body

Next, a colored body according to the present disclosure will be described.

The colored body is produced by applying the metal pigment composition as described above to the substrate which is the object be colored.

The colored body as described above is excellent in glossy feeling and abrasion resistance and has a colored portion which prevents the generation of defects.

The colored body according to the present disclosure may be used for any applications, and for example, the colored body may be applied to recorded matters, ornaments, and others other than those mentioned above. As a particular example of the colored body according to the present disclosure, for example, there may be mentioned automobile interior goods, such as a console lid, a switch base, a center cluster, an interior panel, an emblem, a center console, and a meter name plate; operation portions of various types of electronic devices; decorative portions having decorativeness; and displays, such as an indicator sign and a logo.

Heretofore, although the present disclosure has been described with reference to the preferable embodiments, the present disclosure is not limited thereto.

EXAMPLES

Next, concrete examples of the present disclosure will be described.

[4] Production A of Metal Pigment Composition

Example A1

First, a poly(ethylene terephthalate)-made film having a thickness of 20 μm and a smooth surface at a surface roughness Ra of 0.02 μm or less was prepared.

Next, over one side surface of this film, a release layer was formed by applying a release resin dissolved in acetone using a roller coater.

The poly(ethylene terephthalate)-made film on which the release layer was formed was transported in a vacuum deposition apparatus at a rate of 5 m/s to form an Al-made film having a thickness of 15 nm under reduced pressure.

Next, the poly(ethylene terephthalate)-made film on which the Al-made film was formed was immersed in tetrahydrofuran, and ultrasonic vibration at 40 kHz was applied thereto, so that a dispersion liquid of a metal pigment which was aggregates of Al-made metal particles was obtained.

Next, tetrahydrofuran was removed by a centrifugal machine, and diethylene glycol diethyl ether was added, so that a suspension liquid containing 5 percent by mass of the metal pigment was obtained.

Subsequently, a treatment was performed on this suspension liquid by a circular type high power ultrasonic pulverizer so that the metal particles were pulverized to have a predetermined size. In this treatment, an ultrasonic wave at 20 kHz was applied.

Next, a polyoxyalkyleneamine compound represented by the above formula (4) was added to the suspension liquid described above to have a mass rate with respect to the metal particles as shown in Table 1, and a heat treatment was performed at 55° C. for 1 hour under ultrasonic radiation at 40 kHz, so that the aggregates of the metal particles were disaggregated, and the metal particles were dispersed in a primary particle state. In this case, as the polyoxyalkyleneamine compound, a block copolymer was used in which an amino group was bonded to one terminal of continuous oxyethylene units and a methyl group was bonded to one terminal of continuous oxypropylene units, m/n in the above formula (4) satisfied a condition of 6.3, and the weight average molecular weight of the polyoxyalkyleneamine compound was 1,000.

Furthermore, a specific surface treatment agent which was the compound represented by the above formula (1) was added to have a mass rate with respect to the metal particles as shown in Table 1. In this Example, as the specific surface treatment agent, a mixture containing compounds represented by the above formula (1) in which a's were 1 and 2 and in each of which A was a hydrogen atom and R was an n-decylene group was used.

In addition, by a heat treatment performed at 55° C. for 3 hours under ultrasonic radiation at 28 kHz, the specific surface treatment agent was allowed to react on the surfaces of the metal particles, so that a dispersion liquid of the metal particles surface-modified with the specific surface treatment agent was obtained.

Subsequently, diethylene glycol diethyl ether, tetraethylene glycol monobutyl ether, and γ-butyrolactone were added to the dispersion liquid of the metal particles thus obtained, and as the composition to be used for preparation of the coloring composition, a metal pigment composition which was the pigment dispersion liquid was obtained. To the pigment dispersion liquid thus obtained, cellulose acetate butyrate was added, so that a metal pigment composition which was the coloring composition shown in Table 1 was obtained. The metal pigment composition was a solvent-based composition.

A volume average particle diameter of the metal particles contained in the metal pigment composition thus obtained was 0.50 μm, and an average thickness thereof was 15 nm.

Examples A2 to A17

Except for that metal pigments were prepared to have the compositions as shown in Table 1, and types and ratios of raw materials to be contained were changed to have the compositions as shown in Table 1, metal pigment compositions were produced in a manner similar to that of the above Example A1. An average thickness of the metal particles was adjusted when Al was deposited. An average particle diameter of the metal particles was controlled by adjusting a pulverizing amount thereof in the ultrasonic pulverization.

Example A18

First, a poly(ethylene terephthalate)-made film having a thickness of 20 μm and a smooth surface at a surface roughness Ra of 0.02 μm or less was prepared.

Next, over one side surface of this film, a release layer was formed by applying a release resin dissolved in acetone using a roller coater.

The poly(ethylene terephthalate)-made film on which the release layer was formed was transported in a vacuum deposition apparatus at a rate of 5 m/s to form an Al-made film having a thickness of 17.4 nm under reduced pressure.

Next, the poly(ethylene terephthalate)-made film on which the Al-made film was formed was immersed in tetrahydrofuran, and ultrasonic vibration at 40 kHz was applied thereto, so that a dispersion liquid of a metal pigment which was aggregates of Al-made metal particles was obtained.

Next, tetrahydrofuran was removed by a centrifugal machine, and diethylene glycol diethyl ether was added, so that a suspension liquid containing 5 percent by mass of the metal pigment was obtained.

Subsequently, a treatment was performed on this suspension liquid by a circular type high power ultrasonic pulverizer so that the metal particles were pulverized to have a predetermined size. In this treatment, an ultrasonic wave at 20 kHz was applied.

Next, a polyoxyalkyleneamine compound represented by the above formula (4) was added to have a mass rate with respect to the metal particles as shown in Table 2, and a heat treatment was performed at 55° C. for 1 hour under ultrasonic radiation at 40 kHz, so that the aggregates of the metal particles were disaggregated, and the metal particles were dispersed in a primary particle state. In this case, as the polyoxyalkyleneamine compound, a block copolymer was used in which an amino group was bonded to one terminal of continuous oxyethylene units and a methyl group was bonded to one terminal of continuous oxypropylene units, m/n in the above formula (4) satisfied a condition of 6.3, and the weight average molecular weight of the polyoxyalkyleneamine compound was 1,000.

Furthermore, a specific surface treatment agent which was the compound represented by the above formula (2) was added to have a mass rate with respect to the metal particles as shown in Table 2. In this Example, as the specific surface treatment agent, a compound in which in the above formula (2), A was a carboxy group, R was an n-decylene group, and a was 1 was used.

In addition, by a heat treatment performed at 55° C. for 3 hours under ultrasonic radiation at 28 kHz, the specific surface treatment agent was allowed to react on the surfaces of the metal particles.

Subsequently, diethylene glycol diethyl ether was replaced with water. Accordingly, as a composition to be used for preparation of the coloring composition, a metal pigment composition which was a pigment dispersion liquid containing 5 percent by mass of the metal particles surface-modified with the specific surface treatment agent was obtained.

To the pigment dispersion liquid thus obtained, water, 1,2-hexanediol, propylene glycol, and an urethane resin (Resamine D1060, manufactured by Dainichiseika Color & Chemicals Mfg. Co., Ltd.) were added, so that a metal pigment composition which was the coloring composition shown in Table 2 was obtained. The metal pigment composition was an aqueous-based composition.

A volume average particle diameter of the metal particles contained in the metal pigment composition thus obtained was 0.50 μm, and an average thickness thereof was 15 nm.

Examples A19 to A23

Except for that types of raw materials to be contained were changed to have the compositions shown in Table 2, metal pigment compositions were produced in a manner similar to that of the above Example A18.

Comparative Examples A1 to A3

Except for that types of raw materials to be used for preparation of metal pigment compositions were changed to have the compositions shown in Table 1, metal pigment compositions were produced in a manner similar to that of the above Example A1.

Comparative Examples A4 to A6

Except for that types of raw materials to be used for preparation of metal pigment compositions were changed to have the compositions shown in Table 2, metal pigment compositions were produced in a manner similar to that of the above Example A18.

The compositions of the metal pigment compositions each of which is the coloring composition and the compositions of the metal pigments contained in the metal pigment compositions of the above Examples and Comparative Examples are collectively shown in Tables 1 and 2. In addition, in the tables, as the surface treatment agent represented by the above formula (1), a mixture containing compounds represented by the formula (1) in which a's represent 1 and 2 and in each of which A represents a hydrogen atom and R represents an n-decylene group is shown by "(1)-1"; as the surface treatment agent represented by the above formula (1), a mixture containing compounds represented by the formula (1) in which a's represent 1 and 2 and in each of which A represents a hydrogen atom and R represents an n-dodecylene group is shown by "(1)-2"; as the surface treatment agent represented by the above formula (1), a mixture containing compounds represented by the formula (1) in which a's represent 1 and 2 and in each of which A represents a hydrogen atom and R represents an n-octadecylene group is shown by "(1)-3"; as the surface treatment agent represented by the above formula (1), a mixture containing compounds represented by the formula (1) in which a's represent 1 and 2 and in each of which A represents a hydrogen atom and R represents an n-oleylene group is shown by "(1)-4"; as the surface treatment agent represented by the above formula (1), a mixture containing compounds represented by the formula (1) in which a's represent 1 and 2 and in each of which A represents a hydrogen atom and R represents an n-tetracocylene group is shown by "(1)-5"; as the surface treatment agent represented by the above formula (2), a compound represented by the formula (2) in which A represents a hydrogen atom, R represents an n-dodecylene group, and a represents 1 is shown by "(2)-1"; as the surface treatment agent represented by the above formula (2), a compound represented by the formula (2) in which A represents a hydrogen atom, R represents an n-octadecylene group, and a represents 1 is shown by "(2)-2"; as the surface treatment agent represented by the above formula (2), a compound represented by the formula (2) in which A represents a carboxy group, R represents an n-decylene group, and a represents 1 is shown by "(2)-3"; as the surface treatment agent represented by the above formula (2), a compound represented by the formula (2) in which A represents a hydroxy group, R represents an n-undecylene group, and a represents 1 is shown by "(2)-4"; as the surface treatment agent represented by the above formula (2), a compound represented by the formula (2) in which A represents an amino group, R represents an n-undecylene group, and a represents 1 is shown by "(2)-5"; as the surface treatment agent represented by the above formula (2), a compound represented by the formula (2) in which A represents 2-[2-(2-methoxyethoxy)ethoxy]ethoxy group, R represents an n-undecylene group, and a represents 1 is shown by "(2)-6"; as the polyoxyalkyleneamine compound represented by the above formula (4), a compound in which m/n satisfies a condition of 9.0 and which has a weight average molecular weight of 600 is shown by "POAA1"; as the polyoxyalkyleneamine compound represented by the above formula (4), a compound in which m/n satisfies a condition of 6.3 and which has a weight average molecular weight of 1,000 is shown by "POAA2"; as the polyoxyalkyleneamine compound represented by the above formula (4), a compound in which m/n satisfies a condition of 3.1 and which has a weight average molecular weight of 2,000 is shown by "POAA3"; diethylene glycol diethyl ether is shown by "DEDG"; tetraethylene glycol monobutyl ether is shown by "BTGH"; γ-butyrolactone is shown by "γBL"; 1,2-hexanediol is shown by "1,2HD"; propylene glycol is shown by "PG"; cellulose acetate butyrate is shown by "CAB"; an urethane resin (Resamine D1060, manufactured by Dainichiseika Color & Chemicals Mfg. Co., Ltd.) is shown by "D1060"; octyl phosphate is shown by "OdHP", $CF_3(CF_2)_5(CH_2)_2P(O)$—$(OH)_2$ is shown by "FHP"; and a polyoxyethylene polyoxypropylene block copolymer (PE68, manufactured by Sanyo Chemical Industries, Ltd.) is shown by "PE68". In addition, in Tables 1 and 2, the unit of the content of each component is percent by mass. In addition, POAA1 to POAA3 are each a block copolymer in which an amino group is bonded to one terminal of continuous oxyethylene units and a methyl group is bonded to one terminal of continuous oxypropylene units. In addition, as for the metal particles forming the metal pigment composition of each of the above Examples, arbitrary 50 metal particles were observed. Subsequently, when the particle is viewed in a direction at which a projection area thereof is maximized, that is, when the particle is viewed in plan, the area thereof is represented by $S_1$ [μm$^2$], and an area of the particle viewed in one direction among the directions orthogonal to the observation direction at which the area thereof is maximized is represented by $S_0$ [μm$^2$]. Next, $S_1/S_0$ was obtained, and the average values thereof were all 19 or more. The volume average particle diameter D50 in the table was measured using a Microtrac MT-3300 (laser diffraction/scattering type particle size distribution measurement device, manufactured by MicrotracBEL Corp.). In addition, the viscosities of the metal pigment compositions at 25° C. of the above Examples A1 to A23 measured using a rotational viscometer in accordance with JIS 28809 were all in a range of 1.5 to 15 mPa·s.

TABLE 1

| | METAL PIGMENT | | | | SPECIFIC SURFACE TREATMENT AGENT CONTENT | | | | | | |
|---|---|---|---|---|---|---|---|---|---|---|---|
| | AVERAGE COMPOSITION | AVERAGE THICKNESS | AVERAGE PARTICLE DIAMETER D50 | CONTENT | (1)-1 | (1)-2 | (1)-3 | (1)-4 | (1)-5 | (2)-1 | (2)-2 |
| EXAMPLE A1 | Al | 15 nm | 0.5 μm | 1.5 | 0.15 | — | — | — | — | — | — |
| EXAMPLE A2 | Al | 15 nm | 0.5 μm | 1.5 | — | 0.15 | — | — | — | — | — |
| EXAMPLE A3 | Al | 15 nm | 0.5 μm | 1.5 | — | 0.15 | — | — | — | — | — |
| EXAMPLE A4 | Al | 15 nm | 0.5 μm | 1.5 | — | 0.15 | — | — | — | — | — |
| EXAMPLE A5 | Al | 15 nm | 0.5 μm | 1.5 | — | — | 0.15 | — | — | — | — |
| EXAMPLE A6 | Al | 15 nm | 0.5 μm | 1.5 | — | — | — | 0.15 | — | — | — |
| EXAMPLE A7 | Al | 15 nm | 0.5 μm | 1.5 | — | — | — | — | 0.15 | — | — |
| EXAMPLE A8 | Al | 15 nm | 0.5 μm | 1.5 | — | — | — | — | — | 0.15 | — |
| EXAMPLE A9 | Al | 15 nm | 0.5 μm | 1.5 | — | — | — | — | — | — | 0.15 |
| EXAMPLE A10 | Al | 15 nm | 0.5 μm | 1.5 | — | — | — | 0.075 | — | — | 0.075 |
| EXAMPLE A11 | Al | 5 nm | 0.5 μm | 1.5 | — | — | 0.15 | — | — | — | — |
| EXAMPLE A12 | Al | 30 nm | 0.5 μm | 1.5 | — | — | 0.15 | — | — | — | — |
| EXAMPLE A13 | Al | 90 nm | 0.5 μm | 1.5 | — | — | 0.15 | — | — | — | — |
| EXAMPLE A14 | Al | 15 nm | 0.2 μm | 1.5 | — | — | 0.15 | — | — | — | — |
| EXAMPLE A15 | Al | 15 nm | 1.0 μm | 1.5 | — | — | 0.15 | — | — | — | — |
| EXAMPLE A16 | Al | 15 nm | 0.5 μm | 1.5 | — | — | 0.15 | — | — | — | — |
| EXAMPLE A17 | Al | 15 nm | 0.5 μm | 1.5 | — | — | 0.08 | — | — | — | — |
| COMPARATIVE EXAMPLE A1 | Al | 15 nm | 0.5 μm | 1.5 | — | 0.15 | — | — | — | — | — |
| COMPARATIVE EXAMPLE A2 | Al | 15 nm | 0.5 μm | 1.5 | — | — | — | — | — | — | — |
| COMPARATIVE EXAMPLE A3 | Al | 15 nm | 0.5 μm | 1.5 | — | — | — | — | — | — | — |

| | POLYOXYALKYLENEAMINE COMPOUND CONTENT | | | LIQUID MEDIUM COMPONENT CONTENT | | | RESIN CONTENT | OTHER COMPONENTS CONTENT | | |
|---|---|---|---|---|---|---|---|---|---|---|
| | POAA1 | POAA2 | POAA3 | DEDG | BTGH | γBL | CAB | OdHP | FHP | PE68 |
| EXAMPLE A1 | — | 0.15 | — | 85.6 | 10.0 | 2.5 | 0.1 | — | — | — |
| EXAMPLE A2 | 0.15 | — | — | 85.6 | 10.0 | 2.5 | 0.1 | — | — | — |
| EXAMPLE A3 | — | 0.15 | — | 85.6 | 10.0 | 2.5 | 0.1 | — | — | — |
| EXAMPLE A4 | — | — | 0.15 | 85.6 | 10.0 | 2.5 | 0.1 | — | — | — |
| EXAMPLE A5 | — | 0.15 | — | 85.6 | 10.0 | 2.5 | 0.1 | — | — | — |
| EXAMPLE A6 | — | 0.15 | — | 85.6 | 10.0 | 2.5 | 0.1 | — | — | — |
| EXAMPLE A7 | — | 0.15 | — | 85.6 | 10.0 | 2.5 | 0.1 | — | — | — |
| EXAMPLE A8 | — | 0.15 | — | 85.6 | 10.0 | 2.5 | 0.1 | — | — | — |
| EXAMPLE A9 | — | 0.15 | — | 85.6 | 10.0 | 2.5 | 0.1 | — | — | — |
| EXAMPLE A10 | — | 0.15 | — | 85.6 | 10.0 | 2.5 | 0.1 | — | — | — |
| EXAMPLE A11 | — | 0.15 | — | 85.6 | 10.0 | 2.5 | 0.1 | — | — | — |
| EXAMPLE A12 | — | 0.15 | — | 85.6 | 10.0 | 2.5 | 0.1 | — | — | — |
| EXAMPLE A13 | — | 0.15 | — | 85.6 | 10.0 | 2.5 | 0.1 | — | — | — |
| EXAMPLE A14 | — | 0.15 | — | 85.6 | 10.0 | 2.5 | 0.1 | — | — | — |
| EXAMPLE A15 | — | 0.15 | — | 85.6 | 10.0 | 2.5 | 0.1 | — | — | — |
| EXAMPLE A16 | — | 0.08 | — | 85.7 | 10.0 | 2.5 | 0.1 | — | — | — |
| EXAMPLE A17 | — | 0.15 | — | 85.7 | 10.0 | 2.5 | 0.1 | — | — | — |
| COMPARATIVE EXAMPLE A1 | — | — | — | 85.6 | 10.0 | 2.5 | 0.1 | — | — | 0.15 |
| COMPARATIVE EXAMPLE A2 | — | 0.15 | — | 85.6 | 10.0 | 2.5 | 0.1 | 0.15 | — | — |
| COMPARATIVE EXAMPLE A3 | — | 0.15 | — | 85.6 | 10.0 | 2.5 | 0.1 | — | 0.15 | — |

TABLE 2

| | METAL PIGMENT | | | | SPECIFIC SURFACE TREATMENT AGENT CONTENT | | | | | | |
|---|---|---|---|---|---|---|---|---|---|---|---|
| | COMPOSITION | AVERAGE THICKNESS | AVERAGE PARTICLE DIAMETER D50 | CONTENT | (1)-1 | (1)-2 | (1)-3 | (1)-4 | (2)-1 | (2)-3 | (2)-4 |
| EXAMPLE A18 | Al | 15 nm | 0.5 μm | 1.5 | — | — | — | — | — | 0.3 | — |
| EXAMPLE A19 | Al | 15 nm | 0.5 μm | 1.5 | — | — | — | — | — | — | 0.3 |
| EXAMPLE A20 | Al | 15 nm | 0.5 μm | 1.5 | — | — | — | — | — | — | — |
| EXAMPLE A21 | Al | 15 nm | 0.5 μm | 1.5 | — | — | — | — | — | — | — |

TABLE 2-continued

| | | | | | | | | | | | |
|---|---|---|---|---|---|---|---|---|---|---|---|
| EXAMPLE A22 | Al | 15 nm | 0.5 μm | 1.5 | — | — | — | — | 0.3 | — | — |
| EXAMPLE A23 | Al | 15 nm | 0.5 μm | 1.5 | — | — | — | 0.15 | — | 0.15 | — |
| COMPARATIVE EXAMPLE A4 | Al | 15 nm | 0.5 μm | 1.5 | — | 0.3 | — | — | — | — | — |
| COMPARATIVE EXAMPLE A5 | Al | 15 nm | 0.5 μm | 1.5 | — | — | — | — | — | — | — |
| COMPARATIVE EXAMPLE A6 | Al | 15 nm | 0.5 μm | 1.5 | — | — | — | — | — | — | — |

| | SPECIFIC SURFACE TREATMENT AGENT CONTENT | | POLYOXY-ALKYLENE-AMINE COMPOUND CONTENT | LIQUID MEDIUM COMPONENT CONTENT | | | RESIN CONTENT | OTHER COMPONENTS CONTENT | | |
|---|---|---|---|---|---|---|---|---|---|---|
| | (2)-5 | (2)-6 | POAA2 | 1,2HD | PG | WATER | D1060 | OdHP | FHP | PE68 |
| EXAMPLE A18 | — | — | 0.15 | 15.0 | 15.0 | 67.95 | 0.1 | — | — | — |
| EXAMPLE A19 | — | — | 0.15 | 15.0 | 15.0 | 67.95 | 0.1 | — | — | — |
| EXAMPLE A20 | 0.3 | — | 0.15 | 15.0 | 15.0 | 67.95 | 0.1 | — | — | — |
| EXAMPLE A21 | — | 0.3 | 0.15 | 15.0 | 15.0 | 67.95 | 0.1 | — | — | — |
| EXAMPLE A22 | — | — | 0.15 | 15.0 | 15.0 | 67.95 | 0.1 | — | — | — |
| EXAMPLE A23 | — | — | 0.15 | 15.0 | 15.0 | 67.95 | 0.1 | — | — | — |
| COMPARATIVE EXAMPLE A4 | — | — | — | 15.0 | 15.0 | 67.95 | 0.1 | — | — | 0.15 |
| COMPARATIVE EXAMPLE A5 | — | — | 0.15 | 15.0 | 15.0 | 67.95 | 0.1 | 0.3 | — | — |
| COMPARATIVE EXAMPLE A6 | — | — | 0.15 | 15.0 | 15.0 | 67.95 | 0.1 | — | 0.3 | — |

[5] Evaluation A

[5-1] Dispersion Stability of Metal Particles

The metal pigment composition which was the coloring composition of each of the above Examples and Comparative Examples was filled in a predetermined ink pack, was left in a constant-temperature bath at 55° C. for 8 days, and was then slowly cooled to room temperature.

Subsequently, after the metal pigment composition described above was measured using a particle size distribution measurement device (MT3300EXII, manufactured by Microtrac, Inc.) to obtain the volume average particle diameter D50 of the metal particles, an increase rate in the volume average particle diameter D50 was obtained from that of the metal particles contained in the metal pigment composition before the composition was placed in the constant-temperature bath, and the evaluation was performed in accordance with the following criteria. As the increase rate is decreased, the dispersion stability of the metal particles is evaluated as better. A rank C or higher was regarded as a preferable level.

A: increase rate of volume average particle diameter D50 is less than 2%.
B: increase rate of volume average particle diameter D50 is 2% to less than 7%.
C: increase rate of volume average particle diameter D50 is 7% to less than 13%.
D: increase rate of volume average particle diameter D50 is 13% or more.

[5-2] Glossiness of Colored Body

First, by using the metal pigment composition which was the coloring composition of each of the above Examples and Comparative Examples, a colored body was produced as described below.

That is, first, after the metal pigment composition was charged in an ink jet apparatus, a printed portion was formed on a poly(vinyl chloride)-made film (Mactac5829R, manufactured by Mactac) at a density of 5 mg/inch$^2$ and at a recording resolution of 1,440×1,440 dpi by ejecting the metal pigment composition using the ink jet apparatus described above, so that the colored body was obtained. As the ink jet apparatus, a modified machine of SC-S606850 manufactured by Seiko Epson Corporation was used. The ink jet apparatus had a nozzle density of 360 npi and 360 nozzles in one nozzle line. A recording medium temperature at a platen during the adhesion of the metal pigment composition was set to 45° C., and a recording medium temperature at an after heater was set to 50° C.

The glossiness of the printed portion of the colored body of each of the above Examples and Comparative Examples obtained as described above was measured using a gloss meter, MINOLTA MULTI GLOSS 268, at a tilt angle of 60° and then evaluated in accordance with the following criteria. As this value is increased, the glossiness is evaluated as better. A rank C or higher was regarded as a preferable level.

Evaluation Criteria of Examples A1 to A17 and Comparative Examples A1 to A3

A: glossiness is 460 or more.
B: glossiness is 440 to less than 460.
C: glossiness is 410 to less than 440.
D: glossiness is less than 410.

Evaluation Criteria of Examples A18 to A23 and Comparative Examples A4 to A6

A: glossiness is 360 or more.
B: glossiness is 310 to less than 360.
C: glossiness is 260 to less than 310.
D: glossiness is less than 260.

[5-3] Abrasion Resistance

After the printed portion of each colored body obtained in the above [5-2] was reciprocally rubbed 20 times with a load 500 g using a white cotton cloth, the printed portion was confirmed by visual inspection, and a peeling part of the printed portion was evaluated in accordance with the following criteria. As the value thus obtained is decreased, the abrasion resistance is evaluated as better. A rank C or higher was regarded as a preferable level.

A: Area rate of peeling part of printed portion is less than 10%.
B: Area rate of peeling part of printed portion is 10% to less than 20%.
C: Area rate of peeling part of printed portion is 20% to less than 30%.
D: Area rate of peeling part of printed portion is 30% or more.

The results thereof are shown in Table 3.

TABLE 3

| | DISPERSION STABILITY OF METAL PARTICLES | GLOSSINESS OF COLORED BODY | ABRASION RESISTANCE |
|---|---|---|---|
| EXAMPLE A1 | C | B | C |
| EXAMPLE A2 | C | B | B |
| EXAMPLE A3 | B | B | A |
| EXAMPLE A4 | A | B | A |
| EXAMPLE A5 | A | A | A |
| EXAMPLE A6 | A | A | A |
| EXAMPLE A7 | A | A | B |
| EXAMPLE A8 | B | B | A |
| EXAMPLE A9 | A | A | A |
| EXAMPLE A10 | A | A | A |
| EXAMPLE A11 | B | A | A |
| EXAMPLE A12 | A | A | A |
| EXAMPLE A13 | A | B | A |
| EXAMPLE A14 | A | B | A |
| EXAMPLE A15 | B | A | A |
| EXAMPLE A16 | B | B | B |
| EXAMPLE A17 | B | B | B |
| COMPARATIVE EXAMPLE A1 | D | C | A |
| COMPARATIVE EXAMPLE A2 | C | D | A |
| COMPARATIVE EXAMPLE A3 | C | A | D |
| EXAMPLE A18 | A | A | A |
| EXAMPLE A19 | B | B | B |
| EXAMPLE A20 | A | A | A |
| EXAMPLE A21 | A | A | A |
| EXAMPLE A22 | C | C | B |
| EXAMPLE A23 | B | B | A |
| COMPARATIVE EXAMPLE A4 | D | C | A |
| COMPARATIVE EXAMPLE A5 | C | D | A |
| COMPARATIVE EXAMPLE A6 | C | A | D |

As apparent from Table 3, in all the Examples each using the metal pigment composition of the present disclosure, the dispersion stability of the metal particles was excellent, and the metal pigment composition could be preferably applied to the production of a colored body excellent in glossy feeling and abrasion resistance.

On the other hand, in all the Comparative Examples each using no metal pigment composition of the present disclosure, one of the dispersion stability, the glossy feeling, and the abrasion resistance was inferior.

In addition, although the metal pigment composition could be ejected from the ink jet head in all the Examples, in particular, in the Examples in which the dispersion stability was ranked C or higher, a preferable ejection stability could be obtained, and in the Examples in which the dispersion stability was superior, ejection defects, such as the flight curving and no ejection, were suppressed.

In addition, except for that a poly(ethylene terephthalate)-made film (E1000ZC, manufactured by Lintec Corporation) was used instead of using a poly(vinyl chloride)-made film (Mactac5829R, manufactured by Mactac), evaluations similar to those of the above [5-2] and [5-3] were performed, and results similar to those described above could be obtained.

[6] Production B of Metal Pigment Composition

Example B1

First, a poly(ethylene terephthalate)-made film having a thickness of 20 μm and a smooth surface at a surface roughness Ra of 0.02 μm or less was prepared.

Next, over one side surface of this film, a release layer was formed by applying a release resin dissolved in acetone using a roller coater.

The poly(ethylene terephthalate)-made film on which the release layer was formed was transported in a vacuum deposition apparatus at a rate of 5 m/s to form an Al-made film having a thickness of 15 nm under reduced pressure.

Next, the poly(ethylene terephthalate)-made film on which the Al-made film was formed was immersed in tetrahydrofuran, and ultrasonic vibration at 40 kHz was applied thereto, so that a dispersion liquid of a metal pigment which was aggregates of Al-made metal particles was obtained.

Next, tetrahydrofuran was removed by a centrifugal machine, and diethylene glycol diethyl ether was added, so that a suspension liquid containing 5 percent by mass of the metal pigment was obtained.

Subsequently, a treatment was performed on this suspension liquid by a circular type high power ultrasonic pulverizer so that the metal particles were pulverized to have a predetermined size. In this treatment, an ultrasonic wave at 20 kHz was applied.

Next, a polyoxyalkyleneamine compound represented by the above formula (4) was added to the suspension liquid described above to have a mass rate with respect to the metal particles as shown in Table 4, and a heat treatment was performed at 55° C. for 1 hour under ultrasonic radiation at 40 kHz, so that the aggregates of the metal particles were disaggregated, and the metal particles were dispersed in a primary particle state. In this case, as the polyoxyalkyleneamine compound, a block copolymer was used in which an amino group was bonded to one terminal of continuous oxyethylene units and a methyl group was bonded to one terminal of continuous oxypropylene units, m/n in the above formula (4) satisfied a condition of 6.3, and the weight average molecular weight of the polyoxyalkyleneamine compound was 1,000.

Furthermore, a specific surface treatment agent which was the compound represented by the above formula (1) was added to have a mass rate with respect to the metal particles as shown in Table 4. In this Example, as the specific surface treatment agent, a mixture containing compounds represented by the formula (1) in which a's were 1 and 2 and in each of which A was a hydrogen atom and R was an n-octadecylene group was used.

In addition, by a heat treatment at 55° C. for 3 hours under ultrasonic radiation at 28 kHz, the specific surface treatment agent was allowed to react on the surfaces of the metal particles, so that a dispersion liquid of the metal particles surface-modified with the specific surface treatment agent was obtained.

Subsequently, diethylene glycol diethyl ether in the dispersion liquid of the metal particles thus obtained was evaporated to adjust the content of the metal pigment at 10 percent by mass, so that as a composition to be used for preparation of the coloring composition, a metal pigment composition B1 which was a pigment dispersion liquid was obtained.

A volume average particle diameter of the metal particles contained in the metal pigment composition thus obtained was 0.50 μm, and an average thickness thereof was 15 nm.

Subsequently, diethylene glycol diethyl ether, tetraethylene glycol monobutyl ether, γ-butyrolactone, and cellulose acetate butyrate were added to the composition thus obtained to be used for preparation of the coloring composition, so that a metal pigment composition C1 was obtained which was an ink as the coloring composition shown in Table 5.

A volume average particle diameter of the metal particles contained in the metal pigment composition obtained as described above was 0.50 μm, and an average thickness thereof was 15 nm.

Example B2

First, a poly(ethylene terephthalate)-made film having a thickness of 20 μm and a smooth surface at a surface roughness Ra of 0.02 μm or less was prepared.

Next, over one side surface of this film, a release layer was formed by applying a release resin dissolved in acetone using a roller coater.

The poly(ethylene terephthalate)-made film on which the release layer was formed was transported in a vacuum deposition apparatus at a rate of 5 m/s to form an Al-made film having a thickness of 15 nm under reduced pressure.

Next, the poly(ethylene terephthalate)-made film on which the Al-made film was formed was immersed in tetrahydrofuran, and ultrasonic vibration at 40 kHz was applied thereto, so that a dispersion liquid of a metal pigment which was aggregates of Al-made metal particles was obtained.

Next, tetrahydrofuran was removed by a centrifugal machine, and diethylene glycol diethyl ether was added, so that a suspension liquid containing 5 percent by mass of the metal pigment was obtained.

Subsequently, a treatment was performed on this suspension liquid by a circular type high power ultrasonic pulverizer, so that the metal particles were pulverized to have a predetermined size. In this treatment, an ultrasonic wave at 20 kHz was applied.

Next, a polyoxyalkyleneamine compound represented by the above formula (4) was added to the suspension liquid described above to have a mass rate with respect to the metal particles as shown in Table 4, and a heat treatment was performed at 55° C. for 1 hour under ultrasonic radiation at 40 kHz, so that the aggregates of the metal particles were disaggregated, and the metal particles were dispersed in a primary particle state. In this case, as the polyoxyalkyleneamine compound, a block copolymer was used in which an amino group was bonded to one terminal of continuous oxyethylene units and a methyl group was bonded to one terminal of continuous oxypropylene units, m/n in the above formula (4) satisfied a condition of 6.3, and the weight average molecular weight of the polyoxyalkyleneamine compound was 1,000.

Furthermore, a specific surface treatment agent which was the compound represented by the above formula (1) was added to have a mass rate with respect to the metal particles as shown in Table 4. In this Example, as the specific surface treatment agent, a mixture containing compounds represented by the formula (1) in which a's were 1 and 2 and in each of which A was a hydrogen atom and R was an n-octadecylene group was used.

In addition, by a heat treatment at 55° C. for 3 hours under ultrasonic radiation at 28 kHz, the specific surface treatment agent was allowed to react on the surfaces of the metal particles, so that a dispersion liquid of the metal particles surface-modified with the specific surface treatment agent was obtained.

Subsequently, diethylene glycol diethyl ether was evaporated from the dispersion liquid of the metal particles thus obtained, and butyl acetate was added thereto to adjust the content of the metal pigment at 10 percent by mass, so that as a composition to be used for preparation of the coloring composition, a metal pigment composition B2 which was a pigment dispersion liquid was obtained.

A volume average particle diameter of the metal particles contained in the metal pigment composition thus obtained was 0.50 μm, and an average thickness thereof was 15 nm.

Subsequently, to the composition B2 thus obtained to be used for preparation of the coloring composition, methyl ethyl ketone, isopropyl alcohol, and an urethane resin (Burnock 16-416, manufactured by DIC Corporation) were added, so that a metal pigment composition C2 which was a paint as the coloring composition shown in Table 5 was obtained.

A volume average particle diameter of the metal particles contained in the metal pigment composition obtained as described above was 0.50 μm, and an average thickness thereof was 15 nm.

As for the above Examples B1 and B2, the conditions of the metal pigment composition as the composition to be used for preparation of the coloring composition are collectively shown in Table 4, and as for the metal pigment compositions C1 and C2 as the coloring composition, the amounts of the materials used for the preparation are collectively shown in Table 5. In addition, in the tables, as the surface treatment agent represented by the above formula (1), a mixture containing compounds represented by the formula (1) in which a's represent 1 and 2 and in each of which A represents a hydrogen atom and R represents an n-octadecylene group is shown by "(1)-3"; as the polyoxyalkyleneamine compound represented by the above formula (4), a compound in which m/n satisfies a condition of 6.3 and which has a weight average molecular weight of 1,000 is shown by "POAA2"; diethylene glycol diethyl ether is shown by "DEDG"; tetraethylene glycol monobutyl ether is shown by "BTGH"; γ-butyrolactone is shown by "γBL"; methyl ethyl ketone is shown by "MEK"; isopropyl alcohol is shown by "IPA"; and an urethane resin (Burnock 16-416, manufactured by DIC Corporation) is shown by "16-416". In addition, in Table 4, the unit of the content of each component is percent by mass. In addition, in Table 5, the unit of the use amount of each raw material is parts by mass. In addition, as for the metal pigment forming the metal pigment composition of each of the above Examples B1 and B2, arbitrary 50 metal particles were observed to obtain $S_1/S_0$ described above, and the average values thereof were all 19 or more. The volume average particle diameter D50 in the table was measured using a Microtrac MT-3300 (laser diffraction/scattering type particle size distribution measurement device, manufactured by MicrotracBEL Corp.).

TABLE 4

| | METAL PIGMENT | | | | SPECIFIC SURFACE TREATMENT AGENT CONTENT (1)-3 | POLYOXYALKYLENEAMINE COMPOUND CONTENT POAA2 |
|---|---|---|---|---|---|---|
| | COMPOSITION | AVERAGE THICKNESS | AVERAGE PARTICLE DIAMETER D50 | CONTENT | | |
| EXAMPLE B1 | Al | 15 nm | 0.5 μm | 10.0 | 1.0 | 1.0 |
| EXAMPLE B2 | Al | 15 nm | 0.5 μm | 10.0 | 1.0 | 1.0 |

| | LIQUID MEDIUM COMPONENT CONTENT | | | | | | RESIN CONTENT |
|---|---|---|---|---|---|---|---|
| | DEDG | BTGH | γBL | MEK | IPA | BUTYL ACETATE | CAB 16-416 |
| EXAMPLE B1 | 88.0 | — | — | — | — | — | — |
| EXAMPLE B2 | — | — | — | — | — | 88.0 | — |

TABLE 5

| | PIGMENT DISPERSION LIQUID | | LIQUID MEDIUM COMPONENT USE AMOUNT | | | | | | RESIN USE AMOUNT |
|---|---|---|---|---|---|---|---|---|---|
| | | USE AMOUNT | DEDG | BTGH | γBL | MEK | IPA | BUTYL ACETATE | CAB 16-416 |
| EXAMPLE C1 | EXAMPLE B1 | 15.0 | 72.4 | 10.0 | 2.5 | — | — | — | 0.1 | — |
| EXAMPLE C2 | EXAMPLE B2 | 50.0 | — | — | — | 30.0 | 10.0 | — | — | 10.0 |

[7] Evaluation B

[7-1] Dispersion Stability of Metal Particles

The metal pigment composition which was the coloring composition of each of the above Examples C1 and C2 was filled in a predetermined ink pack, was left in a constant-temperature bath at 55° C. for 10 days, and was then slowly cooled to room temperature.

Next, after the metal pigment composition described above was measured using a particle size distribution measurement device (MT3300EXII, manufactured by Microtrac, Inc.) to obtain the volume average particle diameter D50 of the metal particles, an increase rate in the volume average particle diameter D50 was obtained from that of the metal particles contained in the metal pigment composition before the composition was placed in the constant-temperature bath, and the evaluation was performed in accordance with the following criteria. As the increase rate of the volume average particle diameter of the metal particles is decreased, the dispersion stability of the metal particles is evaluated as better. A rank C or higher was regarded as a preferable level.

A: increase rate of volume average particle diameter D50 is less than 2%.
B: increase rate of volume average particle diameter D50 is 2% to less than 7%.
C: increase rate of volume average particle diameter D50 is 7% to less than 13%.
D: increase rate of volume average particle diameter D50 is 13% or more.

[7-2] Glossiness of Colored Body

First, by using the metal pigment composition which was the coloring composition of each of the above Examples C1 and C2, a colored body was produced as described below.

That is, the metal pigment composition was applied by a bar coater on a poly(vinyl chloride)-made film (Mactac5829R, manufactured by Mactac) used as a recording medium to form a colored portion, so that the colored body was obtained.

The glossiness of the colored portion of the colored body of each of the above Examples B1 and B2 obtained as described above was measured using a gloss meter, MINOLTA MULTI GLOSS 268, at a tilt angle of 60° and was then evaluated in accordance with the following criteria. As this value is increased, the glossiness is evaluated as better. A rank C or higher was regarded as a preferable level.

A: glossiness is 460 or more.
B: glossiness is 440 to less than 460.
C: glossiness is 410 to less than 440.
D: glossiness is less than 410.

[7-3] Abrasion Resistance

After the colored portion of each colored body obtained in the above [7-2] was reciprocally rubbed 20 times with a load 500 g using a white cotton cloth, the colored portion was confirmed by visual inspection, and a peeling part of the colored portion was evaluated in accordance with the following criteria. As the value thus obtained is decreased, the abrasion resistance is evaluated as better. A rank C or higher was regarded as a preferable level.

A: Area rate of peeling part of colored portion is less than 10%.
B: Area rate of peeling part of colored portion is 10% to less than 20%.
C: Area rate of peeling part of colored portion is 20% to less than 30%.
D: Area rate of peeling part of colored portion is 30% or more.

The results thereof are shown in Table 6.

TABLE 6

| | DISPERSION STABILITY OF METAL PARTICLES | GLOSSINESS OF COLORED BODY | ABRASION RESISTANCE |
|---|---|---|---|
| EXAMPLE C1 | A | A | A |
| EXAMPLE C2 | B | C | A |

As apparent from Table 6, the metal pigment composition of the present disclosure was excellent in dispersion stability of the metal particles and could be preferably applied to the production of a colored body excellent in glossy feeling and abrasion resistance.

In addition, except for that a poly(ethylene terephthalate)-made film (E1000ZC, manufactured by Lintec Corporation) as a recording medium was used instead of using a poly(vinyl chloride)-made film (Mactac5829R, manufactured by Mactac), evaluations similar to those of the above [7-2] and [7-3] were performed, and results similar to those described above could be obtained.

What is claimed is:

1. A metal pigment composition which is a coloring composition or a composition to be used for preparation of the coloring composition, the metal pigment composition comprising:
   a metal pigment;
   a polyoxyalkyleneamine compound; and
   a liquid medium component,
   wherein the metal pigment includes metal particles,
   the metal particles are surface-modified with a surface treatment agent, and
   the surface treatment agent is at least one selected from the group consisting of a compound represented by the following formula (1) and a compound represented by the following formula (2)

   $$(A-R-O)_aP(O)(OH)_{3-a} \quad (1)$$

   $$(A-R)P(O)(OH)_2 \quad (2)$$

where in the formulas, A represents a hydrogen atom, a carboxy group, a hydroxy group, an amino group, or an oxyalkylene-containing group, R represents a divalent hydrocarbon group having 10 carbon atoms or more, and a represents 1 or 2.

2. The metal pigment composition according to claim 1, wherein the polyoxyalkyleneamine compound is a compound represented by the following formula (3) or its salt

   $$R^1-(O-R^2)_x-NH_2 \quad (3)$$

where in the formula, $R^1$ represents a hydrogen atom or an alkyl group having 4 carbon atoms or less, $R^2$ represents an alkylene group having 5 carbon atoms or less, X represents an integer of 5 or more, and the polyoxyalkyleneamine compound optionally has at least two types of alkylene groups with different numbers of carbon atoms of $R^2$ in its molecule.

3. The metal pigment composition according to claim 2, wherein the polyoxyalkyleneamine compound is a compound represented by the following formula (4) or its salt

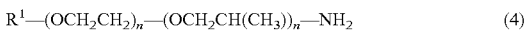
   $$R^1-(OCH_2CH_2)_n-(OCH_2CH(CH_3))_m-NH_2 \quad (4)$$

where in the formula, $R^1$ represents a hydrogen atom or an alkyl group having 4 carbon atoms or less, n and m each independently represent 0 or an integer of 1 or more, m+n represents an integer of 10 or more, and the order of the oxyethylene units and the oxypropylene units in the molecule of the polyoxyalkyleneamine compound is arbitrary.

4. The metal pigment composition according to claim 1, wherein the polyoxyalkyleneamine compound has a weight average molecular weight of 400 to 8,000.

5. The metal pigment composition according to claim 1, wherein a content of the polyoxyalkyleneamine compound with respect to 100 parts by mass of the metal particles is 1.0 to 50 parts by mass.

6. The metal pigment composition according to claim 1, wherein the metal particles are composed of aluminum or an aluminum alloy.

7. The metal pigment composition according to claim 1, wherein the metal particles are in the form of scales.

8. The metal pigment composition according to claim 1, wherein the metal pigment composition is a solvent-based composition containing an organic solvent as the liquid medium component.

9. The metal pigment composition according to claim 1, wherein the metal pigment composition is an aqueous-based composition containing water as the liquid medium component.

10. The metal pigment composition according to claim 1, wherein a content of the surface treatment agent with respect to 100 parts by mass of the metal particles is 1.0 to 50 parts by mass.

11. The metal pigment composition according to claim 1, wherein the metal pigment composition is the coloring composition.

12. The metal pigment composition according to claim 1, wherein the metal pigment composition is an ink jet ink.

13. A coloring method comprising:
adhering the metal pigment composition according to claim 1, which is the coloring composition, to a substrate.

* * * * *